United States Patent [19]

Arnheim et al.

[11] Patent Number: 4,490,942

[45] Date of Patent: Jan. 1, 1985

[54] WINDOW PANE, ADJUSTABLE IN HEIGHT, PARTICULARLY FOR MOTOR VEHICLES

[75] Inventors: Hans-Rudolf Arnheim, Jembke; Hermann Warner, Trebur, both of Fed. Rep. of Germany

[73] Assignee: General Motors Corporation, Detroit, Mich.

[21] Appl. No.: 456,139

[22] Filed: Jan. 6, 1983

[30] Foreign Application Priority Data

Jan. 8, 1982 [DE] Fed. Rep. of Germany ....... 3200322

[51] Int. Cl.³ .............................................. E05F 11/38
[52] U.S. Cl. ....................................... 49/374; 49/440; 49/485
[58] Field of Search ................. 49/373, 374, 375, 425, 49/348, 502, 485

[56] References Cited

U.S. PATENT DOCUMENTS

| | | | |
|---|---|---|---|
| 3,703,053 | 11/1972 | De Rees et al. | 49/375 X |
| 4,240,227 | 12/1980 | Hasler et al. | 49/374 X |
| 4,417,419 | 11/1983 | Rossie et al. | 49/374 X |
| 4,418,498 | 12/1983 | Wanlass et al. | 49/425 X |

FOREIGN PATENT DOCUMENTS

| | | |
|---|---|---|
| 0040588 | 11/1981 | European Pat. Off. . |
| 2435766 | 2/1976 | Fed. Rep. of Germany ........ 49/227 |
| 2808235 | 8/1979 | Fed. Rep. of Germany . |
| 2843004 | 4/1980 | Fed. Rep. of Germany . |

*Primary Examiner*—Kenneth Downey
*Attorney, Agent, or Firm*—William A. Schuetz

[57] ABSTRACT

A vertically adjustable window panel, especially for use in a door of a motor vehicle, which is arranged so as to be flush with the adjacent parts of the vehicle body and in which the guide means thereof as well as the window sealing means are disposed inboard of the window panel.

7 Claims, 6 Drawing Figures

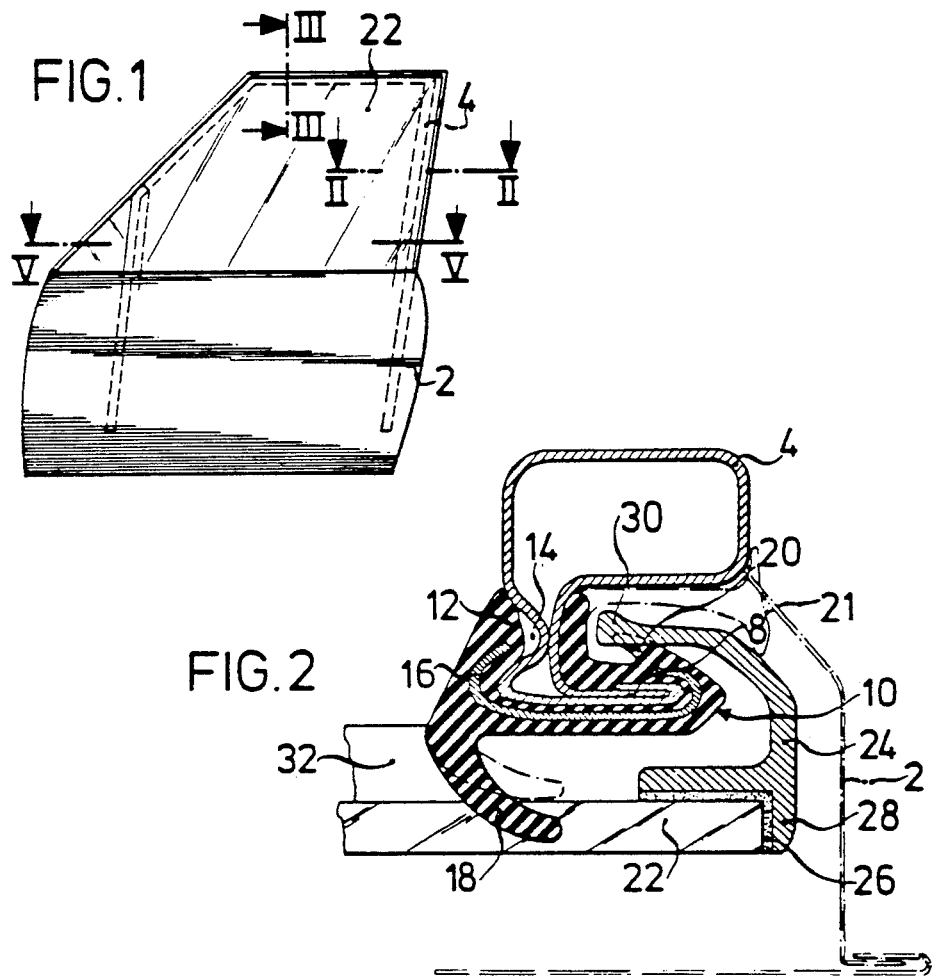
FIG.1
FIG.2
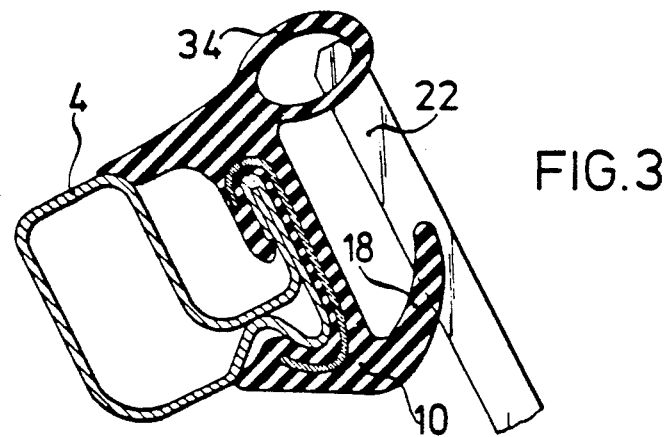
FIG.3

WINDOW PANE, ADJUSTABLE IN HEIGHT, PARTICULARLY FOR MOTOR VEHICLES

The invention is directed to a vertically adjustable window panel, especially for use in a door of a motor vehicle, which is arranged so as to be flush with the adjacent parts of the vehicle body, and in which the guide means thereof as well as the window sealing means are being disposed inboard of the window panel.

In an arrangement of this type disclosed in the German DE-AS No. 28 09 721 and DE-OS No. 29 24 309, the guide means is inwardly off-set from the margin of the window panel. A sealing strip is bearing upon the window panel itself. In this arrangement, the guide means are in the form of individually arranged sliding elements which are secured to the window panel near the upper and lower end thereof. If in this arrangement the window panel is to be lowered completely into the door, the upper sliding element is caused to move downwardly through the window well packing. As a result, the window well packing cannot bear directly upon the window sealing strip because a gap must be maintained between the end of the well packing and the window sealing strip through which the sliding element can move downwardly into the door. This gap between the well packing and the window sealing strip has the disadvantage that noise from within the door is admitted into the occupant compartment. Also, an arrangement of this type does not look very neat. The sliding elements are guided directly in an elongate guide member of the window frame, also laterally, so that tolerance compensation in the longitudinal direction of the window, i.e., the longitudinal direction of the vehicle, is difficult, if not impossible. Furthermore, dimensional variations in the sliding member transversely to the window plane may cause increased friction in the elongate guide member.

While tolerance compensation is possible in the arrangement according to FIG. 3 of German DE-OS No. 28 40 811, dimensional variations in the retention or guide member may cause excessive friction in guiding the window panel, or may have the result that insufficient contact pressure is being exerted by the window sealing strip on the window.

It is the object of the present invention to provide a window guide in which tolerance compensation in the longitudinal direction of the window panel is achieved without difficulty. Furthermore, friction is to be reduced in guiding the window panel along the window frame, and only insignificant changes to be caused as a result of tolerance variations in guiding the window panel. But more significantly, the present invention provides that the window well is bearing directly on the window sealing strip, so that there is no gap which permits noise to be transmitted from within the door to the occupant compartment.

This objective is achieved in accordance with the invention in that the window sealing strip is disposed farther away from the margin of the window panel than the window guide means, and in that the latter is guided along the window frame, with a yieldable elastomeric guide strip, corresponding in type to the window sealing strip, being interposed between the guide means and the window frame, and said guide strip being biased against the guide means in oppostion of the bias of the sealing strip. The employment of an elastically yieldable guide strip not only provides better noise isolation, but has, in combination with the window sealing strip, the additional advantage that the physical impact that is generated whenever the vehicle door is being shut is dampened. The material used for the window sealing strip and the guide strip should be of a type so as to provide proper sealing and guiding characteristics without generating excessive friction between the guide means and the guide strip.

In addition to the type of material selected for the window sealing strip and the guide strip, which may be rubber or plastics, it is important for achieving proper sealing, guiding and sliding characteristics, that the sealing and guide strip be of appropriate sectional configuration. Thus, the invention further proposes that the window sealing strip be, as is conventional, of the lip-shaped type. It has been found to be advantageous that the guide strip, too, be of lip-shaped cross-section.

In terms of manufacturing and assembly technique, it is proposed that the lip-shaped sealing strip and the lip-shaped guide strip be in the form of one unitary profiled strip. Furthermore, thanks to the lip-shaped cross-section of both the sealing strip and the guide strip, friction is reduced to a large degree. If the sealing strip and the guide strip are in the form of two separate members, the guide strip may be rigidly fixed to the guide means and be adapted to slide in a track.

The cross-section of the lip-shaped sealing strip and the lip-shaped guide strip may be such that the respective lips are extending in the same or in opposite direction, depending on whether the guide means are directed, when viewed from the edge of the window, towards the inside of the windown panel or away from it.

It has been found to be of advantage that the guide means be in the form of a track. A continuous track of this type in itself serves as a sort of sealing means or at least as a dust shield. Thus, a closed-in space is provided between the guide rail and the actual window seal. Preferably, the track is attached directly to the peripheral margin of the window panel, and a flange provided on the track covers the edge of the window panel. Thus, the track serves as a means of protecting the window panel against damage and also as a sort of window frame.

The portion of the lip-shaped sealing strip disposed in the lateral area of the window panel corresponds, when viewed in cross-section, to the portion disposed in the upper area, so that a uniform transitional area is being formed between the two sealing strip portions at their juncture.

The invention will now be described in detail by way of exemplary embodiments:

In the drawings:

FIG. 1 is a side view of a vehicle door,

FIG. 2 is a sectional view along line II—II in in FIG. 1,

FIG. 3 is a sectional view along line III—III in FIG. 1,

Figure 4:
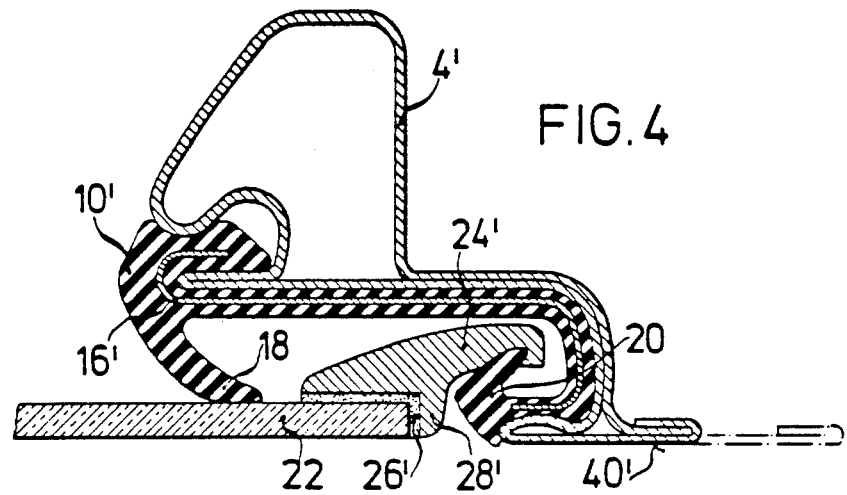
FIG. 4 is another embodiment of the arrangement according to cross-section II—II in FIG. 1.

The vehicle door (2) illustrated in FIG. 1 is provided with a window frame (4) disposed inboard of the vehicle, whose lateral portions are extending downardly between the inner and outer door panel, and a window panel (22) is guided along said window frame (4). The window frame (4) is made of rolled sectional steel. The section, i.e. profile, may look like that illustrated in FIG. 2 and includes a flange designated by the numeral (8) which is spaced from the remainder of the window frame 4 to define a vertically extending recess. Attached to flange (8) is a length of profiled strip (10) having a leg (12) which engages a complimentary recess (14), so as to assist in retaining the profiled strip (10) on the window frame (4). However, attachment of the profiled strip (10) to the window frame (4) can be accomplished in a variety of ways. The profiled strip (10) is provided with a metallic reinforcement (16). Otherwise, the profiled strip is made of rubber or plastics of a predetermined hardness. The profiled strip (10) is comprised of the lip-shaped window sealing strip (18) and the guide strip (20), which is also lip-shaped. In order to perform the function of sealing and guiding, the profiled strip (10) must be made of a material which is of a predetermined hardness and which exhibits some definite friction characteristics. Furthermore, a covering or conceiling lip (21) may be formed onto the profiled strip (10), as indicated by the dash-dotted lines in FIG. 2.

The sealing strip (18) abuts against the window panel (22). A guide rail (24) is attached to the marginal area of the window panel (22) by way of an adhesive (26). The guide rail (24) is provided with a flange (28) which abuts against the edge of the window panel and serves as a shield for protecting said edge against damage. The guide rail (24) embraces the guide strip (20) from behind by means of an arm (30) which extends interiorly of the window panel 22 and longitudinally thereof and with the arm (30) being received within the recess defined by the flange 8 and the remainder of the window frame 4. The lip-shaped sealing strip (18) is biased against the window panel (22), and the lip-shaped guide strip is biased against the arm (30) of the guide rail (24). Thus, the window panel is guided, to a limited degree, elastically in transverse direction relative to its travel along the window frame (4). The window sealing strip (18) is in direct abutting relation with the window well sealing means (32) extending along the lower edge of the window opening, i.e., without any gap being present therebetween.

FIG. 3 is a cross section of the upper portion of the frame (4) extending along the roof. Here, the profiled strip (10) forms the window seal (18), and the guide strip (20) is being dispensed with. Instead of the guide strip (20), an auxiliary sealing strip (34) is provided, which will engage the upper edge of the window panel (22) when the window is in the closed position. Just as in the arrangement shown in FIG. 2, the profiled strip (10) is attached to the window frame (4). The cross-section of the elongate profiled member (10) in the area of the window sealing strip (18) is the same as that of FIG. 2, ie.e., the length of the vertical sealing strip (18). Thus, in the corner areas, the profiled lengths of the vertical and the horizontal sealing strip are engaging one another with no area of transition being apparent. The window sealing strip (18) and the window well seal (32) are forming a closed sealing frame, even though the drop window, i.e. the window panel (22), can be completely lowered. Thus, the sealing surfaces on the window panel (22) are not interrupted by the employment of fastening means.

FIG. 4 illustrates a modification of the embodiment according to FIG. 2. Again, the profiled elastomeric strip (10') made of rubber or plastics is secured to the window frame (4'), which differs somewhat from the one in FIG. 2. The lip-shaped window sealing strip is again designated by the numeral (18), and the guide strip by the numeral (20). The guide rail (24') projects outwardly from the edge of the window panel (22) and is attached thereto by means of an adhesive foil (26'). Here, too, the guide rail (24') is provided with a flange (28') for shielding the edge of the window. One portion of the window frame (4') is formed into surface (40') which is flush with the window panel (22). Said surface (40') may be extended outwardly, as indicated by the dash-dotted lines, so as to conceil the door pillar. As is apparent from the drawing, the lip-shaped sealing strip (18) and the lip-shaped guide strip (20) are extending in substantially the same direction, i.e., both are facing toward the left-hand side.

Figure 5:
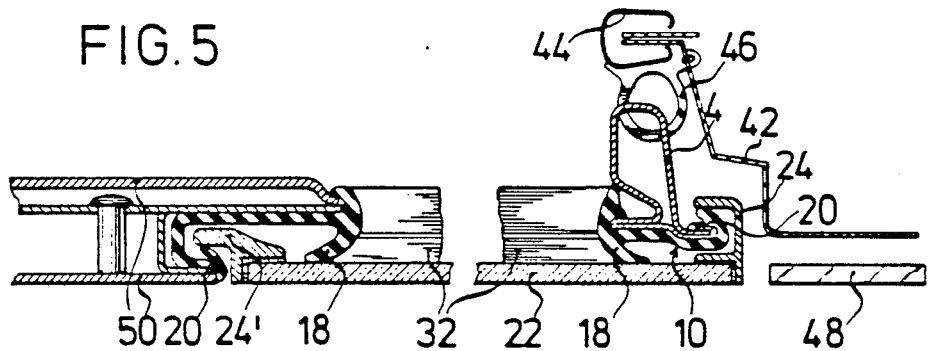
FIG. 5 is a sectional view along V—V in FIG. 1.

In FIG. 5, which is a cross-section along line V—V of FIG. 1, different arrangements are illustrated for guiding the front and the rear of the window panel (22). The right-hand, i.e. the rear guiding arrangement, corresponds substantially to the one of FIG. 2. The parts are therefore illustrated like those in FIG. 2. A door pillar (42) is disposed adjacent the window frame (4) and the guide rail (24). A door seal (46) is provided on the door pillar (42) and retained thereon by the flange molding (44). When the door is closed, the window frame (4) will abut against the seal (46). The outside of the door pillar (42) is covered by the rearwardly disposed side window.

Figure 6:
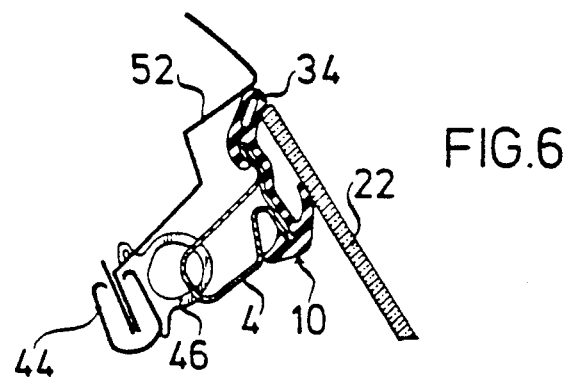
FIG. 6 is another sectional view along line III—III in FIG. 1.

In the left-hand portion of FIG. 5, the guide channel is formed by sheet metal parts and is covered by a plastic panel (50). In all other respects, the sealing and guide arrangement corresponds to the one illustrated in FIG. 4, i.e., the guide rail (24') is also directed outwardly with respect to the window edge. The window well seal (32) is disposed intermediate the two window seals (18). FIG. 6 is a cross-section along line III—III of FIG. 1, i.e., a section according to FIG. 3. The window frame (4) corresponds to the one shown in the right-hand portion of FIG. 5, and the same is true of the elongate profiled member (10), except that it is provided with an auxiliary seal (34). The edge of the roof is designated by the numeral (52), and the numeral (46) identifies again the door seal which is retained by means of the flange molding (44). The window seal (18) with its lateral and upper portion, as well as the seal (32), are forming a closed sealing frame for engaging the window panel (22), which is flush with with the adjacent members of the vehicle body.

SUMMARY

The object to be achieved is that of providing that in a vertically adjustable window panel for motor vehicles, which is mounted flush with the adjacent body members, the seal for the window well is to bear directly upon the window seal. Furthermore, tolerance compensation in the longitudinal direction of the window panel and transversely thereto is to be effected with respect to the window frame.

It is therefore proposed that the window seal be spaced apart from the edge of the window panel at a greater distance than the window guide means, and that the latter be directed along the window frame, with an elastomeric guide strip, corresponding in type to the window sealing strip, being interposed therebetween, said guide strip being biased against the guide means in opposition to the bias of the window sealing strip.

Although the illustrated embodiments hereof have been described in great detail, it should be apparent that certain modifications, changes and adaptations may be made in the illustrated embodiments, and thatit is intended to cover all such modifications, changes and adaptations which come within the spirit of the present invention.

We claim:

1. In a door for an automotive vehicle comrising a vertically adjustable window panel having side edges and which is arranged so as to be flush with adjacent body parts of the vehicle, a stationary window frame located wholly inboard of the side edge of the window and which inludes a flange which defines with the remainder of the window frame a generally vertically extending recess, a guide rail secured to said window along its interior side and being located substantially wholly inboard of the side edge of the window, said guide rail including a guide arm which extends interiorly of the window panel and longitudinally of the window panel and with said guide arm being received within said recess for vertical movement therein, sealing means secured to said flange of said window and located wholly inboard from the side edge of the window panel, said sealing means including a first deflectable sealing lip for engaging said window panel on its interior side at a location spaced further inboard than said guide rail and a second sealing strip located in said recess and engaging said guide arm, said second sealing strip being biased against said guide arm in opposition to the bias of said first sealing lip against said window panel.

2. In a door for an automotive vehicle, as defined in claim 1, wherein the second sealing strip includes a deflectable sealing lip engageable with said guide arm.

3. In a door for an automotive vehicle, as defined in claim 2, wherein said first sealing lip and said sealing lip of said second guide strip are integral with each other so as to form a single sealing means which is secured to the window frame.

4. In a door for an automotive vehicle, as defined in claim 1, wherein the guide rail includes a flange secured to the edge of the window panel to cover and protect the same.

5. In a door for an automotive vehicle, as defined in claim 1, wherein the window frame defines a second recess facing in the opposite direction to said vertically extending recess which receives said guide arm and wherein the sealing means includes an arm which is received in said second recess to aid in retaining said sealing means on said window frame.

6. In a door for an automotive vehicle, as defined in claim 5, wherein said sealing means includes a metallic reinforcement extending around said flange on said window frame.

7. In a door for an automotive vehicle, as defined in claim 5, wherein said sealing means extends around said flange of said window frame and has an end portion which lies in said recess of said window frame.

* * * * *